(12) United States Patent
Chen et al.

(10) Patent No.: US 9,792,968 B2
(45) Date of Patent: Oct. 17, 2017

(54) SELF-TIMED RESET PULSE GENERATOR AND MEMORY DEVICE WITH SELF-TIMED RESET PULSE GENERATOR

(71) Applicant: eMemory Technology Inc., Hsinchu (TW)

(72) Inventors: Chih-Chun Chen, Taipei (TW);
Chun-Hung Lin, Hsinchu (TW);
Cheng-Da Huang, Hsinchu County (TW)

(73) Assignee: eMemory Technology Inc., Hsinchu (TW)

( * ) Notice: Subject to any disclaimer, the term of this patent is extended or adjusted under 35 U.S.C. 154(b) by 0 days.

(21) Appl. No.: 15/406,800

(22) Filed: Jan. 16, 2017

(65) Prior Publication Data

US 2017/0206946 A1 Jul. 20, 2017

Related U.S. Application Data

(60) Provisional application No. 62/280,137, filed on Jan. 19, 2016.

(51) Int. Cl.
*G11C 7/10* (2006.01)
*G11C 7/22* (2006.01)

(52) U.S. Cl.
CPC . *G11C 7/22* (2013.01); *G11C 7/10* (2013.01)

(58) Field of Classification Search
CPC ......... G11C 7/222; G11C 7/22; G11C 7/1051;
G11C 11/4076; G11C 11/4093; G11C 11/4096; G11C 7/1057; G11C 7/1066; G11C 16/08; G11C 7/1039; G11C 7/106; G11C 7/1078
See application file for complete search history.

(56) References Cited

U.S. PATENT DOCUMENTS

| | | | |
|---|---|---|---|
| 5,268,869 A | 12/1993 | Ferris et al. | |
| 7,359,265 B2 | 4/2008 | Yuan et al. | |
| 8,830,766 B2 | 9/2014 | Sahu | |
| 2015/0326213 A1* | 11/2015 | Huber | G06F 5/06 327/202 |

* cited by examiner

*Primary Examiner* — Thong Q Le
(74) *Attorney, Agent, or Firm* — Jianq Chyun IP Office

(57) ABSTRACT

A self-timed reset pulse generator includes a flip-flop, a tracking block, and a tracking circuit. The flip-flop receives an input signal and a feedback signal and outputting a reset signal. The tracking block has replicating cells coupled in series and replicates a structure in an external device. The tracking block has a first terminal and a second terminal. The first terminal and the second terminal are taking from the tracking block at a same location or two different locations. The tracking circuit unit receives the reset signal and receives the first terminal and the second terminal for respectively discharging the tracking block at the first terminal and sensing a voltage level at the second terminal as triggered by the reset signal. A track-out signal serving as the feed back signal is output to the flip-flop when the voltage level is less than or equal to a threshold.

16 Claims, 4 Drawing Sheets

SELF-TIMED RESET PULSE GENERATOR AND MEMORY DEVICE WITH SELF-TIMED RESET PULSE GENERATOR

CROSS-REFERENCE TO RELATED APPLICATION

This application claims the priority benefit of U.S. provisional application Ser. No. 62/280,137, filed on Jan. 19, 2016. The entirety of the above-mentioned patent application is hereby incorporated by reference herein and made a part of this specification.

BACKGROUND

1. Field of the Invention

The present invention generally relates to memory device, in particular, to self-timed reset pulse generator and memory device with self-timed reset pulse generator.

2. Description of Related Art

The memory device basically includes a memory cell unit and peripheral control circuit to control access to the memory cells of the memory cell unit. The memory cell unit may have various designs in different structure. However, a string of memory cells needs to be discharged or reset in operation.

In one of the memory cell unit, each bit line includes a plurality of memory cells coupled in series. The bit lines are connected to a Y-path unit for selecting the bit line. And then, a plurality of discharging and sensing units are used to respectively discharge the bit lines and sense the data in the bit lines.

However, the discharging process in RC discharging mechanism consumes much time in accessing operation on the memory cell unit. How to reduce the discharging time is still an issue in consideration for speeding up the accessing time.

SUMMARY OF THE INVENTION

The present invention has proposed a memory device with a self-timed reset pulse generator, so to properly control a stop of discharging process of the bit line. The accessing time is not wasted in waiting for fully completion of discharging process by a constant set of discharging time.

In an embodiment, the invention provides a self-timed reset pulse generator including a flip-flop circuit unit, a tracking block, and a tracking circuit unit. The flip-flop circuit unit receives an input signal and a feedback signal and outputs a reset signal, wherein the reset signal is externally output for resetting an external device. The tracking block has a plurality of replicating cells coupled in series and replicates a structure in the external device wherein the tracking block has a first terminal and a second terminal, wherein the first terminal and the second terminal are taking from the tracking block at a same location or two different locations. The tracking circuit unit receives the reset signals and receives the first terminal and the second terminal for respectively discharging the tracking block at the first terminal and sensing a voltage level at the second terminal as triggered by the reset signal, wherein the track-out signal serving as the feedback signal to the flip-flop circuit changes from a first logic state to a second logic state to cause a logic state of the reset signal being changed when the voltage level at the second terminal in comparison is less than or equal to a threshold as predetermined.

In further an embodiment, as to the self-timed reset pulse generator above, the cells of the tracking block are replicate memory cells, serving as a replicate bit line in a memory device.

In further an embodiment, as to the self-timed reset pulse generator above, the delay circuit unit is a buffer.

In further an embodiment, as to the self-timed reset pulse generator above, the tracking circuit unit comprises a discharge path for discharging the tracking block at the first terminal and a sensing circuit for sensing the voltage level at the second terminal.

In further an embodiment, as to the self-timed reset pulse generator above, the first terminal and the second terminal are taking from the same location of the tracking block at middle region of the tracking block.

In further an embodiment, as to the self-timed reset pulse generator above, the first terminal and the second terminal are taking from a first location and a second location of the tracking block, the first location is relatively close to a first end of the tracking block and the second location is relatively close to a second end of the tracking block.

In further an embodiment, as to the self-timed reset pulse generator above, the first location is the first end of the tracking block and the second location is the second end of the tracking block.

In further an embodiment, the invention provides a memory device including a memory cell unit and a self-timed reset pulse generator. The memory cell unit includes a plurality of bit lines, a Y-path circuit, and a plurality of discharging and sensing units. Each of the bit lines comprises a plurality of memory cells coupled in series; a Y-path circuit for selecting one of the bit lines as intended; and a plurality of discharging and sensing units, respectively corresponding to bit lines for respectively discharging the bit lines and sensing data in the bit lines. The self-timed reset pulse generator includes a flip-flop circuit unit, a tracking block, and a tracking circuit unit. The flip-flop circuit unit receives an input signal and a feedback signal and outputs a reset signal, wherein the reset signal is externally output for discharging the bit lines of the memory cell unit. The tracking block has a plurality of replicating cells coupled in series and replicates a structure of one of the bit lines in the memory cell unit, wherein the tracking block has a first terminal and a second terminal, wherein the first terminal and the second terminal are taking from the tracking block at a same location or two different locations. The tracking circuit unit receives the reset signal and receives the first terminal and the second terminal for respectively discharging the tracking block at the first terminal and sensing a voltage level at the second terminal as triggered by the reset signal, wherein the track-out signal serving as the feedback signal to the flip-flop circuit changes from a first logic state to a second logic state to cause a logic state of the reset signal being changed when the voltage level is less than or equal to a threshold as predetermined.

In further an embodiment, as to the memory device, the cells of the tracking block are replicate memory cells form the memory cell of the bit lines, serving as a replicate bit line of the bit lines in the memory cell unit.

In further an embodiment, as to the memory device, the delay circuit unit is a buffer.

In further an embodiment, as to the memory device, the tracking circuit unit comprises a discharge path for discharging the tracking block at the first terminal and a sensing circuit for sensing the voltage level at the second terminal.

In further an embodiment, as to the memory device, the first terminal and the second terminal are taking from the same location of the tracking block at middle region of the tracking block.

In further an embodiment, as to the memory device, the first terminal and the second terminal are taking from a first location and a second location of the tracking block, the first location is relatively close to a first end of the tracking block and the second location is relatively close to a second end of the tracking block.

In further an embodiment, as to the memory device, the first location is the first end of the tracking block and the second location is the second end of the tracking block.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
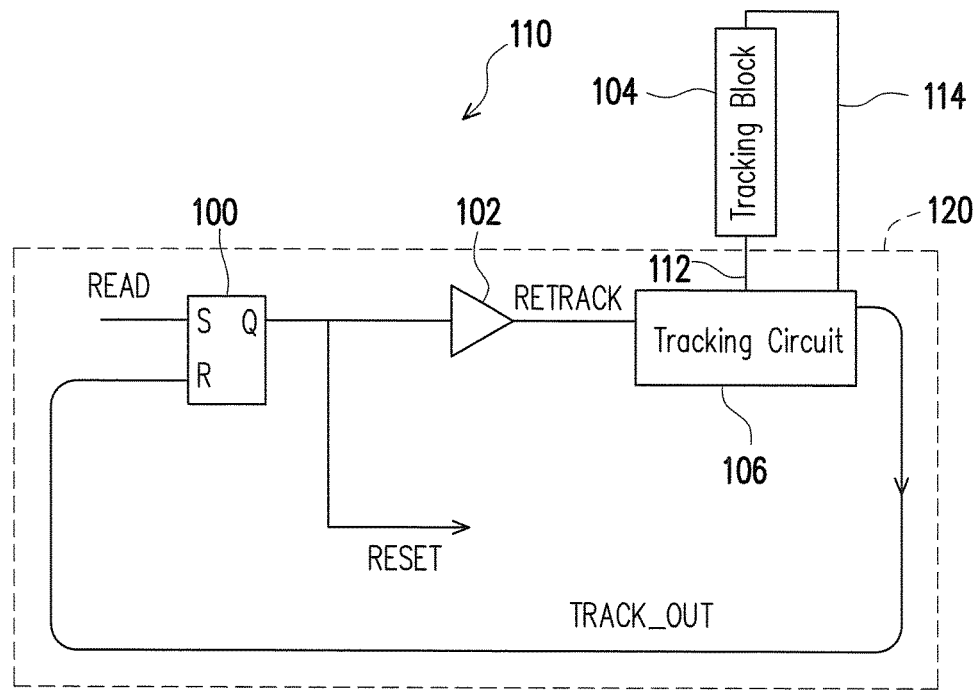
FIG. 1 is a drawing, schematically illustrating a circuit diagram of self-timed reset pulse generator, according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The memory cell array basically has multiple memory cells coupled in series as a cell string, which is also a part of the bit line to be selected. Each memory cell is equivalent to a RC circuit cell and would accumulate certain charges in operation. In operation, for example, the bit line with the memory cells needs to be discharged before reading. However, the discharging time is not always the same in operation. In conventional manner, a long constant period is set for assure that all of the bit lines in any case can be surely discharged. In other words, the constant period usually is rather larger than the actual need for discharging the bit lines. This causes the wasting time in accessing operation.

The invention has a proposed a self-timed reset pulse generator, which can be equipped in the memory device so to stop the discharging process in time without wasting time. Several embodiments are provided for describing the invention but not for limiting the invention.

Figure 3:
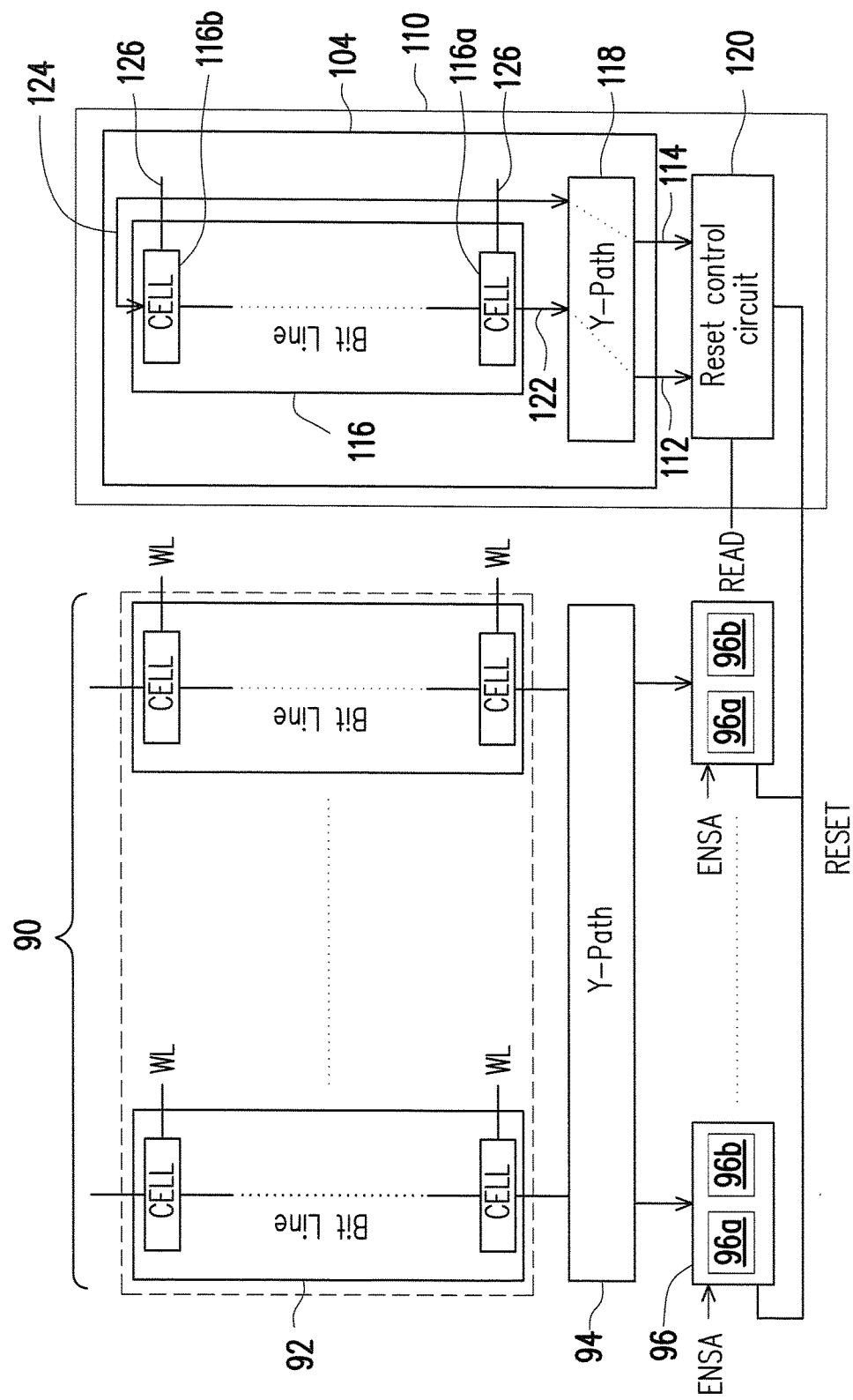
FIG. 3 is a drawing, schematically illustrating a circuit diagram of a memory device, according to an embodiment of the invention.

FIG. 1 is a drawing, schematically illustrating a circuit diagram of self-timed reset pulse generator, according to an embodiment of the invention. Referring to FIG. 1, generally, a self-timed reset pulse generator 110 as provided includes a flip-flop circuit unit 100, a delay circuit unit 102, a tracking block 104, and a tracking circuit unit 106. The self-timed reset pulse generator 110 generally is not limited to the use in memory device for control the discharging process for bit line. In other words, the tracking block 104 can be a replicating block of one of multiple circuit strings of a general circuit, needed to be discharged. The general circuit can be the memory device or any device with the similar cell string to be discharged. The following embodiment, as shown in FIG. 3 later, is taking the memory device as the example.

The flip-flop circuit unit 100 receives an input signal, as for example denoted by READ and a feedback signal, as for example indicated by TRACK-OUT. The flip-flop circuit unit 100 also has a terminal to output a reset signal, as for example denoted by RESET. The reset signal RESET is externally output for resetting an external device. The external device in an example is the memory cell unit 90 as to be shown in FIG. 3. The delay circuit unit delays the reset signal RESET to have a reset-track signal, as for example denoted by RETRACK. The tracking block 104 has a plurality of replicating cells coupled in series and replicates a structure in the external device. The tracking block 104 has a first terminal 112 and a second terminal 114, wherein the first terminal 112 and the second terminal 114 are taking from the tracking block 104 at a same location or two different locations.

Figure 4:
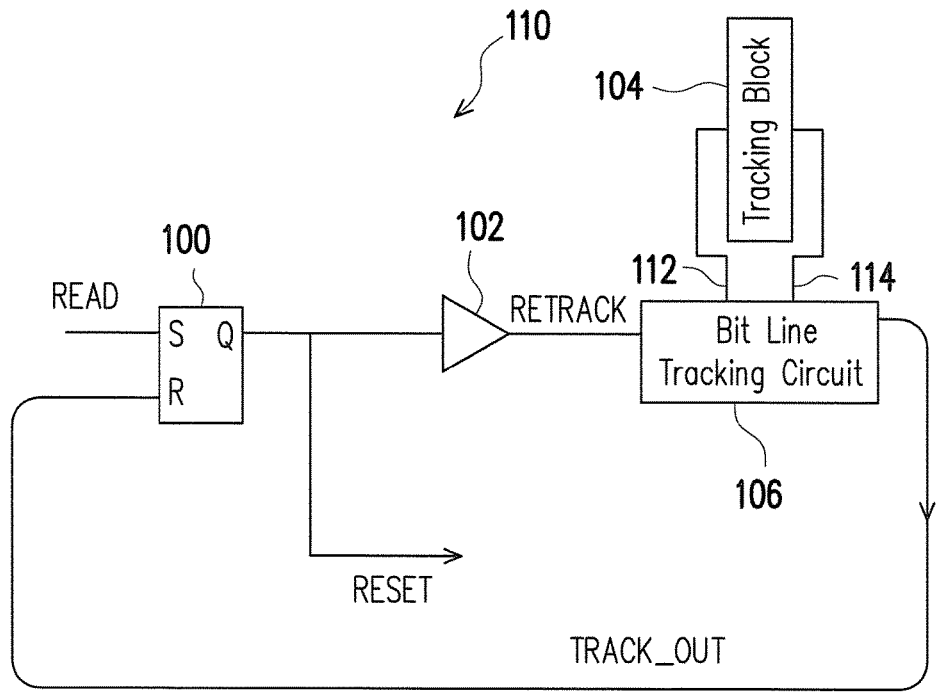
FIG. 4 is a drawing, schematically illustrating a circuit diagram of self-timed reset pulse generator, according to an embodiment of the invention.

The first terminal 112 and the second terminal 114 in an example are taking from the same location of the tracking block 104 at middle region of the tracking block 104, as to be described in better detail in FIG. 4.

In the embodiment of FIG. 1, the first terminal 112 and the second terminal 114 are taking from a first location and a second location of the tracking block 104. The first location is relatively close to a first end of the tracking block 104 and the second location is relatively close to a second end of the tracking block 104. Even more in an embodiment, the first location is the first end of the tracking block and the second location is the second end of the tracking block.

Taking the manner in FIG. 1 for the two locations in tracking block 104 at least has a reason. For the string with multiple cells, if the tracking block 104 is discharged at the first end, the lower end of the tracking block 104 as shown in FIG. 1, then it can be expected that the beginning cell at the second end, that is, the top end as shown in FIG. 1 would be the last one to finish the discharging process. The voltage level at the second terminal 114 would assure the completion of discharging process.

As the subsequent actions, the tracking circuit unit 106 receives the first terminal 112 and the second terminal 114 for respectively discharging the tracking block 104 at the first terminal 112 and sensing a voltage level at the second terminal 114. A TRACK-OUT signal serving as the feed back signal is output from the tracking circuit unit 106 to the flip-flop circuit unit 100. The track-out signal TRACK-OUT is triggered to a logic high state to disable the signal RESET which is sent to the discharging and sensing units 96 (see FIG. 3). The signal RESET is then changed to logic low state to stop the discharging process in time.

The delay circuit unit 102, such as a buffer, in FIG. 1 is set a pre-set delay with respect to the RESET signal to assure the external device to fully start the discharging process.

In another aspect, the self-timed reset pulse generator 110 may be regarded as two parts of which one part is the tracking block 104 and another part is a reset control circuit 120 including the flip-flop circuit unit 100, the delay circuit unit 102, and the tracking circuit unit 106.

Figure 2:
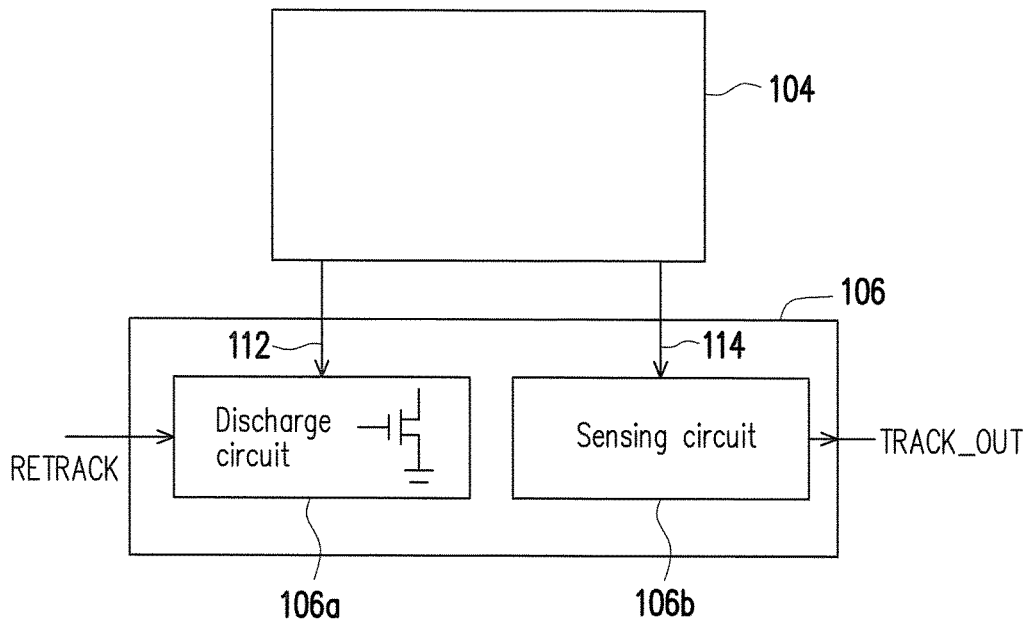
FIG. 2 is a drawing, schematically illustrating a circuit diagram of tracking circuit unit, according to an embodiment of the invention.

FIG. 2 is a drawing, schematically illustrating a circuit diagram of tracking circuit unit, according to an embodiment of the invention. Referring to FIG. 2, the tracking circuit unit 106 is described in better detail. The tracking circuit unit 106 in an example includes a discharge circuit 106a and a sensing circuit 106b. The discharge circuit 106a provides a discharge path, and include a transistor switch in an example under control by the signal RETRACK for cause the discharging process to the tracking block 104 at the first terminal 112. The sensing circuit 106b in an example includes a sensing amplifier to sense the voltage level at the second terminal 114 and output the signal TRACK-OUT when the voltage level is less than or equal to a threshold. The signal TRACK-OUT is a feedback signal to be provided to the flip-flop circuit unit 100 as shown in FIG. 1.

The application of the self-timed reset pulse generator 110 in an example is for the memory device. FIG. 3 is a drawing, schematically illustrating a circuit diagram of a memory device, according to an embodiment of the invention. Referring to FIG. 3, the memory device includes a memory cell unit 90 and the self-timed reset pulse Generator 110.

The memory cell unit 90 includes a plurality of bit lines 92, a Y-path circuit 94 and a plurality of discharging and sensing units 96. Each bit line 92 includes a plurality of memory cells CELL coupled in series. The Y-path circuit 94 is coupled with the bit lines 92 for selecting one of the bit lines 92 as intended. The discharging and sensing units 96 are respectively corresponding to bit lines 92 for respectively discharging the bit lines 92 and sensing data in the bit lines. The discharging and sensing units 96 in an example includes discharging circuit 96a and a sensing circuit 96b as usually known in the art without descriptions in detail. The discharging circuit 96a can be controlled by the reset signal RESET to perform discharging process. The sensing circuit 96b can be controlled by a sensing enable signal ENSA to perform sensing process. In an embodiment of low power operation, the sensing enable signal ENSA is triggered by the falling edge of the reset signal RESET, and the logic state of the ENSA signal will change from Low to High. And the sensing enable signal ENSA is disabled after a certain time period or by the rising edge of the read enable signal READ, and the logic state of the ENSA signal will change from High to Low. In an embodiment of high speed operation, the sensing enable signal ENSA is always kept high.

The self-timed reset pulse generator 110 as equipped with the memory cell unit 90 including a replicating circuit which is equivalent to the bit line 92, the Y-path circuit 94 and the discharging and sensing units 96 and further include the control mechanism. So, as also referring to FIG. 1, the self-timed reset pulse generator 110 may be regarded as two parts of which one part is the tracking block 104 and another part is a rest control circuit 120 including the flip-flop circuit unit 100, the delay circuit unit 102, and the tracking circuit unit 106. As an example in application of the self-timed reset pulse generator 110 with the memory cell unit 90, the flip-flop circuit unit 100 receives an input signal, such as the read enable signal READ and a feedback signal TRACK-OUT and outputs a reset signal RESET. The reset signal RESET is externally output for discharging the bit lines 92 of the memory cell unit 90 by the mechanism as also described in previous paragraph. The delay circuit unit 102 delays the reset signal RESET to have a reset-track signal RETRACK.

Further, the tracking block 104 has a plurality of replicating cells 116a coupled in series and replicates a structure of one of the bit lines 92 in the memory cell unit. In addition the Y-path circuit 94 is also replicated by the Y-path circuit 118 in the tracking block 104 in an example. The tracking block 104 has a first terminal 112 and a second terminal 114, wherein the first terminal 112 and the second terminal 114 are taking from the tracking block 104 at a same location or two different locations. In detail, the first terminal 112 and the second terminal 114 are taking from the replicating bit line 116 at a same location or two different locations. In the embodiment of FIG. 3, the first terminal 112 and the second terminal 114 are taking from the tracking block 104 at two different locations 122 and 124, corresponding to the two locations at the first terminal 112 and the second terminal 114 as considered in FIG. 1.

The tracking circuit unit 106 of the reset control circuit 120 receives the first terminal 112 and the second terminal 114 for respectively discharging the tracking block 104 or the replicating bit line 116 in detail at the first terminal 112 and sensing a voltage level at the second terminal 114. The track-out signal TRACK-OUT serving as the feed back signal is output to the flip-flop circuit unit 100. When the voltage level of the second terminal 114 is less than or equal to a threshold, the track-out signal TRACK-OUT is triggered to a logic high state to disable the signal RESET which is sent to the discharging and sensing units 96. The signal RESET is then changed to logic Low state to stop the discharging process in time.

In an embodiment, the word line terminals 126 of the cells of the replicating bit line 116 may be also connected to the corresponding word line terminals WL of the cells of the memory cell unit 90 to have better replicating condition. However, in further another embodiment, to avoid the influence on sensing speed in the memory cell unit 90, the word line terminals WL belonging to the memory cell unit 90 may be not connected to the replicating bit line 116. In this situation, the word line terminals 126 of the cells of the replicating bit line 116 can be connected to a constant voltage or even to an another terminal of the cell.

As to the first terminal 112 and the second terminal 114 of the tracking block 104, another embodiment is provided. FIG. 4 is a drawing, schematically illustrating a circuit diagram of self-timed reset pulse generator, according to an embodiment of the invention. The embodiment of the self-timed reset pulse generator 110 in FIG. 4 is similar to the self-timed reset pulse generator 110 show in FIG. 1 except the locations of the first terminal 112 and the second terminal 114. In this example, the first terminal 112 and the second terminal 114 are taking form the same location of the tracking block 104 at middle region of the tracking block, of the replicating bit line 116 in FIG. 3. In this situation, the bit line can also be discharged from the first terminal 112. However, the second terminal 114 is not connected to the cell, which is expected to be discharged at the latest time in the whole tracking block. However, this difference may cause the stop of discharging the bit line to be a little bit earlier than the situation that the second terminal 114 is connected to the end cell in FIG. 1. Even in this manner, the concept of the invention is still working to stop the discharging process in time.

Figure 5:
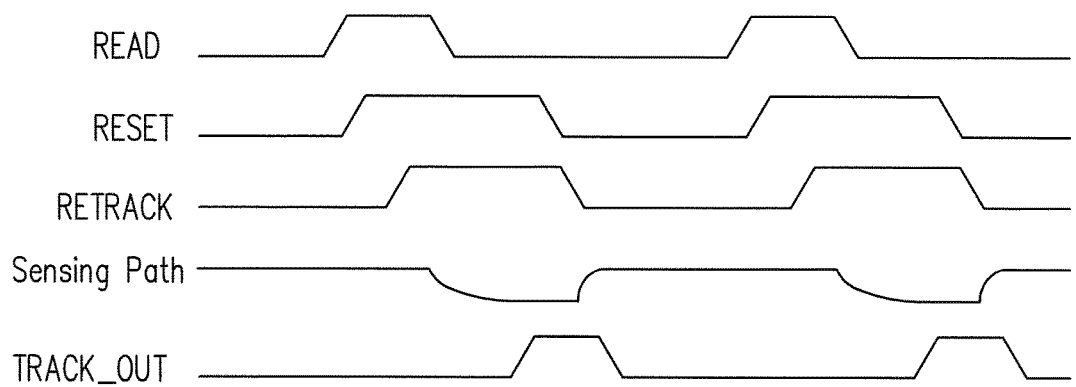
FIG. 5 is a drawing, schematically illustrating a timing diagram for the signals used in the self-timed reset pulse generator, according to an embodiment of the invention.

FIG. 5 is a drawing, schematically illustrating a timing diagram for the signals used in the self-timed reset pulse generator, according to an embodiment of the invention. Referring to FIG. 5, the timing for the signal of READ, RESET, RETRACK, Sensing and TRACK-out are shown. The signal READ is a read enable signal from a system to access the memory. The signal RESET is to be sent to the discharging and sensing units 96 to control (start or stop) the discharging process in time. The signal RETRACK is delayed by the delay circuit unit 102 with respect to the signal RESET by a preset time to assure the memory cell unit 90 (the external device) to fully start the discharging process. The sensing signal is the voltage level at the second terminal 114 of the tracking block 104. When the voltage level of the sensing signal drops equal to or less than a threshold then the signal TRACK-OUT is output. The TRACK-OUT is fed back to the flip-flop circuit unit 100 to disable the signal RESET for stop the discharging process in the memory cell unit 90.

In an embodiment of high speed operation, the sensing circuit 106b of the tracking circuit unit 106 is always turned on. In an embodiment of low power operation, the sensing circuit 106b will be turned on once the read enable signal READ goes Hi and turned off after the signal TRACK-OUT goes to Lo from Hi.

Figure 6:
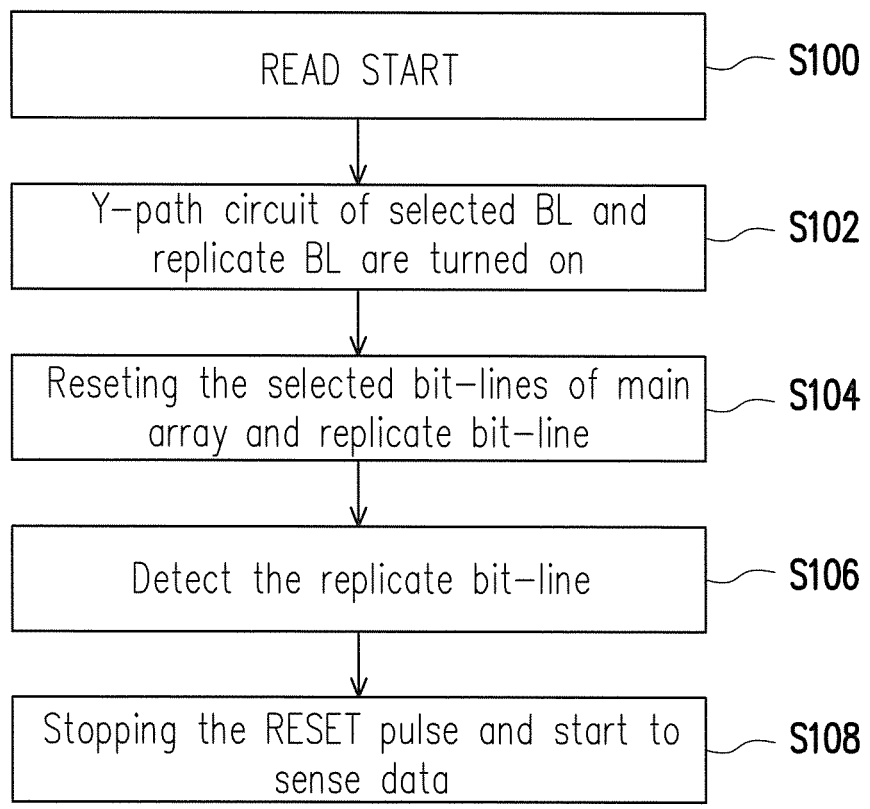
FIG. 6 is a drawing, schematically illustrating a method for the self-timed reset pulse generator in operation, according to an embodiment of the invention.

FIG. 6 is a drawing, schematically illustrating a method for the self-timed reset pulse generator in operation, according to an embodiment of the invention. Referring to FIG. 6, from another aspect of the invention, the method to operate the self-timed reset pulse generator 110 for controlling the discharging time can include several steps. In step S100, the READ signal enables the reading process. In step S102, the Y-path circuit of the selected bit line (BL) 92 and the Y-path circuit 118 of the replicating bit line 116 are turned on. In step S104, the selected bit line of the main array and the replicating bit line are reset for starting discharging. In step S106, a voltage level of the replicate bit line at the second terminal 114 is detected. In step 108, the RESET signal is disabled and the selected bit line stop discharging and then start sensing data.

The invention has proposed the self-timed reset pulse generator 110 to replicate an actual bit line by the tracking block. So the voltage level of the tracking block is detected to determine the time to stop discharging the bit line, so to start to sense the data of the bit line in time. The invention can assure the completion of discharging process and start the sensing process in time. The time in waiting due to the constant set of the reset time can be effectively avoided. The access time to the memory can be speeded up.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A self-timed reset pulse generator, comprising:
a flip-flop circuit unit, receiving an input signal and a feedback signal and outputting a reset signal, wherein the reset signal is externally output for resetting an external device;
a tracking block, having a plurality of replicating cells coupled in series and replicating a structure in the external device wherein the tracking block has a first terminal and a second terminal, wherein the first terminal and the second terminal are taking from the tracking block at a same location or two different locations; and
a tracking circuit unit, receiving the rest signal and receiving the first terminal and the second terminal for respectively discharging the tracking block at the first terminal and sensing a voltage level at the second terminal as triggered by the reset signal, wherein a track-out signal serving as the feedback signal is output to the flip-flop circuit unit,
wherein the track-out signal serving as the feedback signal to the flip-flop circuit changes from a first logic state to a second logic state to cause a logic state of the reset signal being changed when the voltage level at the second terminal in comparison is less than or equal to a threshold as predetermined.

2. The self-timed reset pulse generator of claim 1, wherein the cells of the tracking block are replicate memory cells, serving as a replicate bit line in a memory device.

3. The self-timed reset pulse generator of claim 1, further comprising a delay circuit unit for delaying the reset signal before the rest signal enters the tracking circuit unit.

4. The self-timed reset pulse generator of claim 3, wherein the delay circuit unit is a buffer.

5. The self-timed reset pulse generator of claim 1, wherein the tracking circuit unit comprises a discharge path for discharging the tracking block at the first terminal and a sensing circuit for sensing the voltage level at the second terminal.

6. The self-timed reset pulse generator of claim 1, wherein the first terminal and the second terminal are taking from the same location of the tracking block at middle region of the tracking block.

7. The self-timed reset pulse generator of claim 1, wherein the first terminal and the second terminal are taking from a first location and a second location of the tracking block, the first location is relatively close to a first end of the tracking block and the second location is relatively close to a second end of the tracking block.

8. The self-timed reset pulse generator of claim 7, wherein the first location is the first end of the tracking block and the second location is the second end of the tracking block.

9. A memory device, comprising:
a memory cell unit, comprising:
a plurality of bit lines, each bit line comprises a plurality of memory cells coupled in series;
a Y-path circuit, for selecting one of the bit lines as intended; and
a plurality of discharging and sensing units, respectively corresponding to bit lines for respectively discharging the bit lines and sensing data in the bit lines; and
a self-timed reset pulse generator, comprising:
a flip-flop circuit unit, receiving an input signal and a feedback signal and outputting a reset signal, wherein the reset signal is externally output for reset of discharging the bit lines of the memory cell unit;
a tracking block, having a plurality of replicating cells coupled in series and replicating a structure of one of the bit lines in the memory cell unit, wherein the tracking block has a first terminal and a second terminal, wherein the first terminal and the second terminal are taking from the tracking block at a same location or two different locations; and
a tracking circuit unit, receiving the reset signal and receiving the first terminal and the second terminal for respectively discharging the tracking block at the first terminal and sensing a voltage level at the second terminal as triggered by the reset signal,
wherein the track-out signal serving as the feedback signal to the flip-flop circuit changes from a first logic state to a second logic state to cause a logic state of the reset signal being changed when the voltage level at the second terminal in comparison is less than or equal to a threshold as predetermined.

10. The memory device of claim 9, wherein the cells of the tracking block are replicate memory cells form the memory cell of the bit lines, serving as a replicate bit line of the bit lines in the memory cell unit.

11. The self-timed reset pulse generator of claim 9, wherein the self-timed reset pulse generator further comprises a delay circuit unit for delaying the reset signal before the reset signal enters the tracking circuit unit.

12. The memory device of claim 11, wherein the delay circuit unit is a buffer.

13. The memory device of claim 9, wherein the tracking circuit unit comprises a discharge path for discharging the tracking block at the first terminal and a sensing circuit for sensing the voltage level at the second terminal.

14. The memory device of claim 9, wherein the first terminal and the second terminal are taking from the same location of the tracking block at middle region of the tracking block.

15. The memory device of claim 9, wherein the first terminal and the second terminal are taking from a first location and a second location of the tracking block, the first location is relatively close to a first end of the tracking block and the second location is relatively close to a second end of the tracking block.

16. The memory device of claim 15, wherein the first location is the first end of the tracking block and the second location is the second end of the tracking block.

* * * * *